United States Patent [19]

Gerard et al.

[11] 4,345,303

[45] Aug. 17, 1982

[54] OPTICAL SYSTEMS PERMITTING CONTROLLED SHIFTING OF THE BEAM PATTERN IN HEADLAMPS, ESPECIALLY FOR VEHICLES

[75] Inventors: Roland Gerard, Saint-Maurice; Norbert Brun, Bobigny; Jacques Ricard, Paris, all of France

[73] Assignee: Cibie Projecteurs, Bobigny, France

[21] Appl. No.: 191,499

[22] Filed: Sep. 29, 1980

[30] Foreign Application Priority Data

Oct. 2, 1979 [FR] France .................................. 79 24508
Dec. 24, 1979 [FR] France .................................. 79 31584

[51] Int. Cl.³ .............................................. B60Q 1/00
[52] U.S. Cl. ........................................ 362/80; 362/83;
362/268; 362/279; 362/280; 362/281; 362/307;
362/308; 362/309; 362/319; 362/328; 362/329;
362/331; 362/339
[58] Field of Search ................... 362/80, 83, 268, 279,
362/280, 281, 307, 308, 309, 319, 328, 329, 331,
339

[56] References Cited

U.S. PATENT DOCUMENTS 3,522,424  8/1970  Fritsch ................................. 362/268
3,849,642 11/1974  Puyplat ............................... 362/268
3,999,056 12/1976  Faulhaber ........................... 362/268
4,241,388 12/1980  Green .................................. 362/268

*Primary Examiner*—Stephen J. Lechert, Jr.
*Attorney, Agent, or Firm*—Alan H. Levine

[57] ABSTRACT

A vehicle headlamp is constructed with its reflector and front lens adapted to be fixedly mounted in the bodywork of the vehicle, but incorporates a beam deflecting system, in order that the direction of the beam may nonetheless be adjusted. In one form, the beam deflecting system comprises two Fresnel lenses, mounted face to face in a position to intercept the whole of the headlamp beam, one being equivalent to a diverging lens with cylindrical surfaces, and one being equivalent to a converging lens with cylindrical surfaces. In a neutral position, the effects of the two lenses cancel out, so that no deflection of the beam occurs. One of the lenses is movable in translation away from the neutral position, so that a deflection of the beam occurs, without any other change in the beam pattern. In modified embodiments, the stationary Fresnel lens is not used; instead, its effect is produced by using a reflector of modified shape.

13 Claims, 30 Drawing Figures

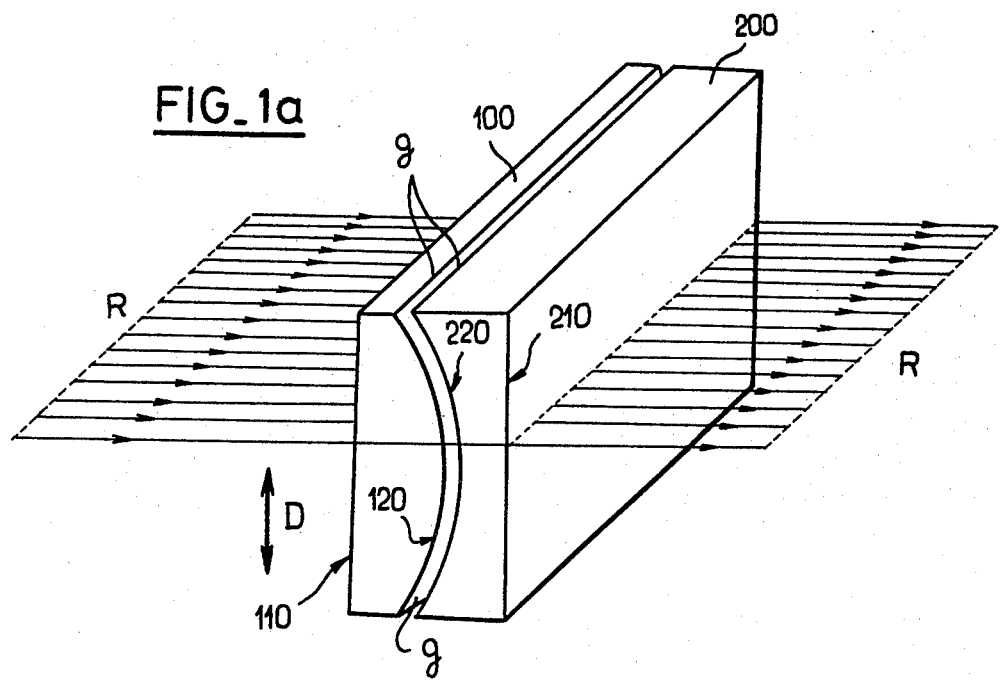
FIG_1a
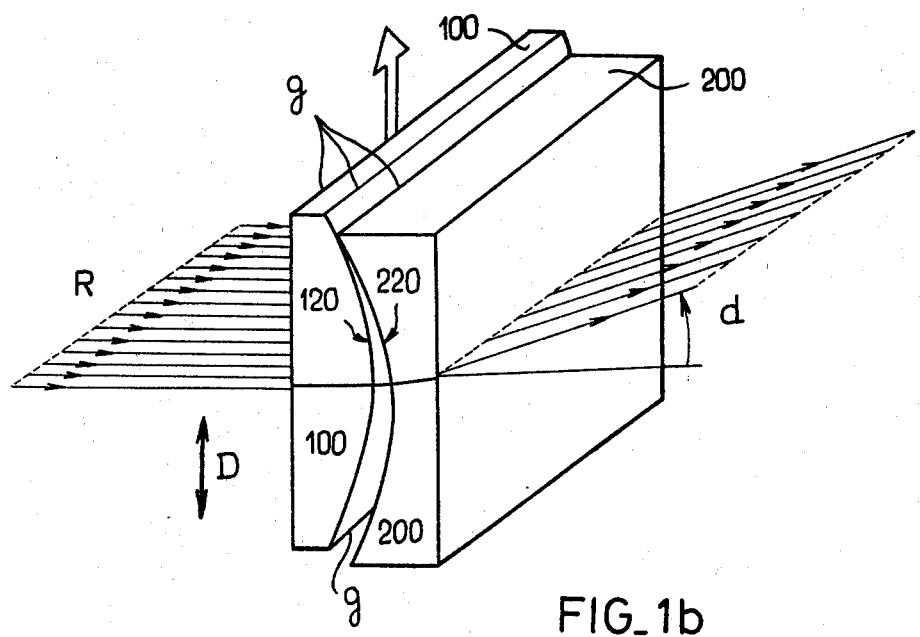
FIG_1b

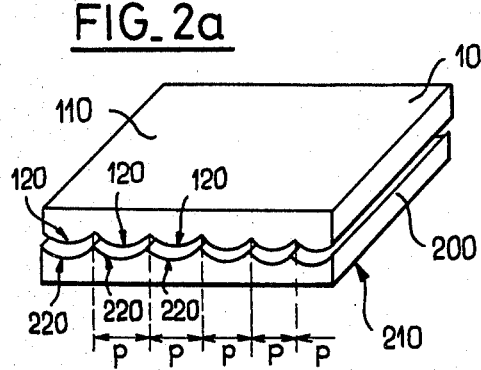
FIG._2a
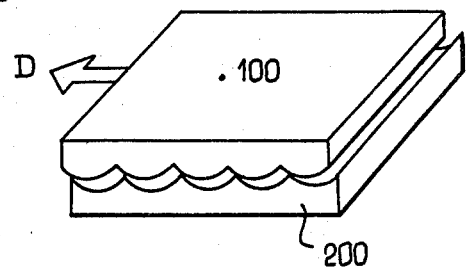
FIG._2b
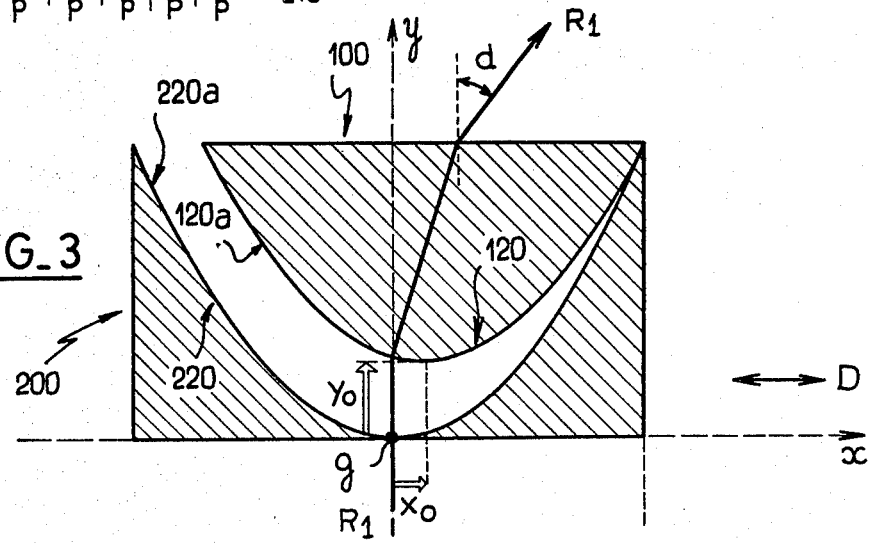
FIG._3
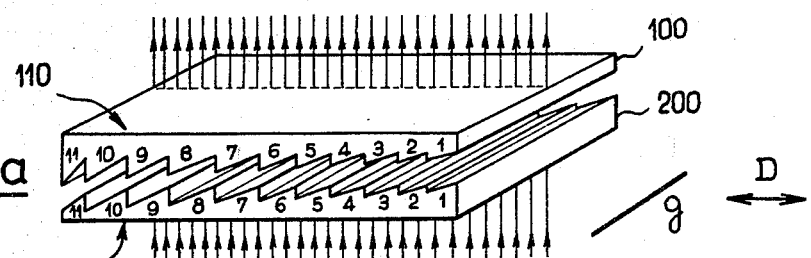
FIG._4a
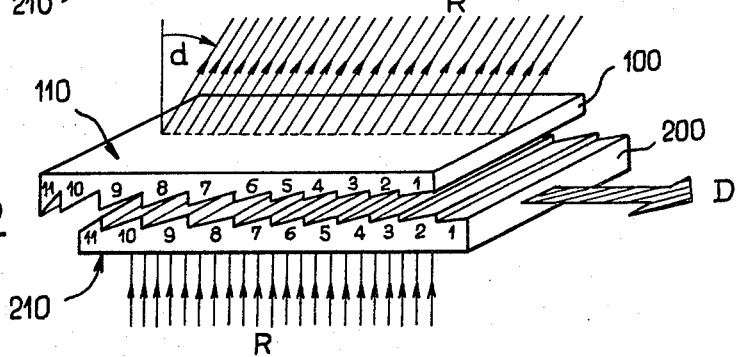
FIG._4b

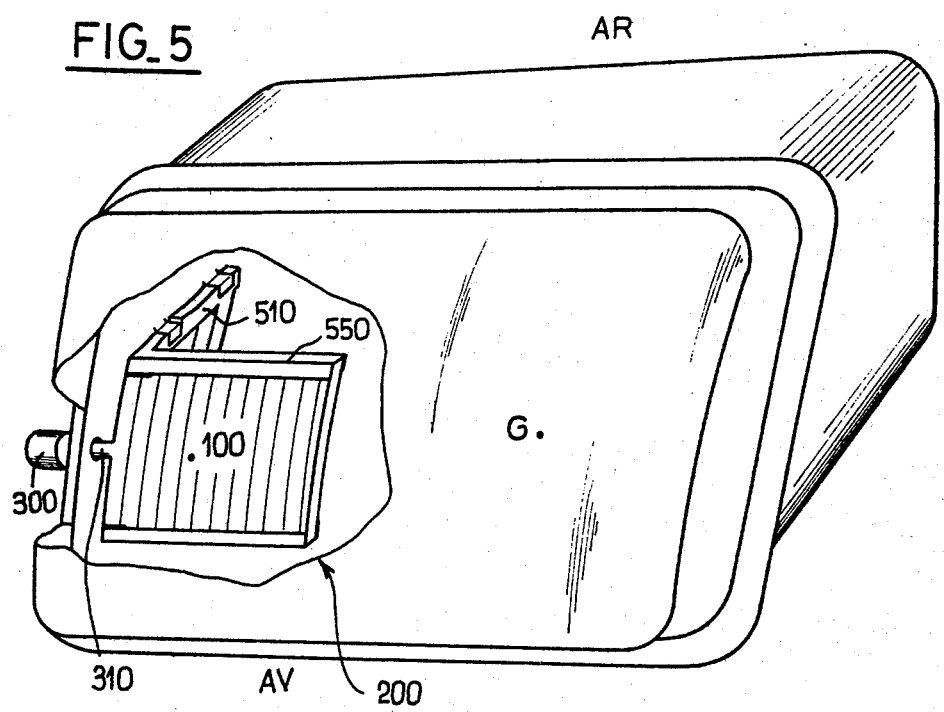
FIG_5
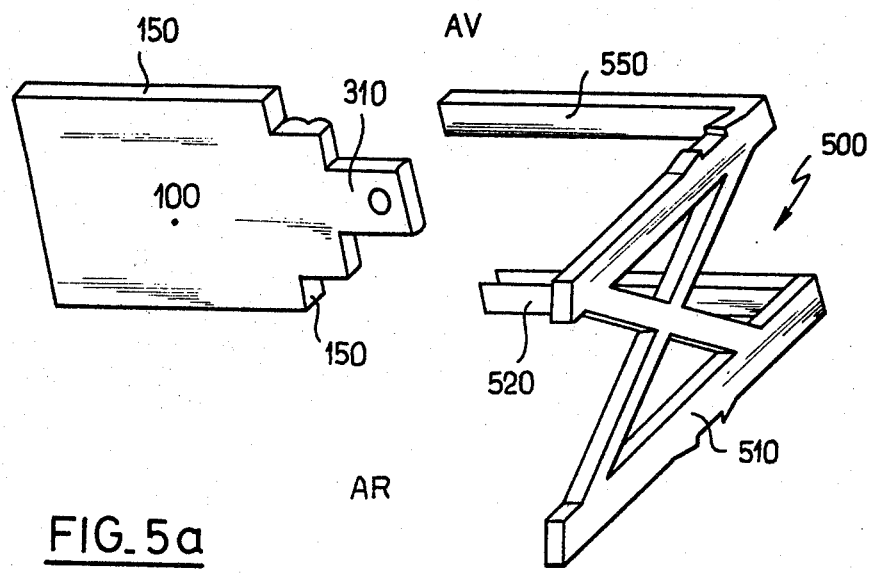
FIG_5a

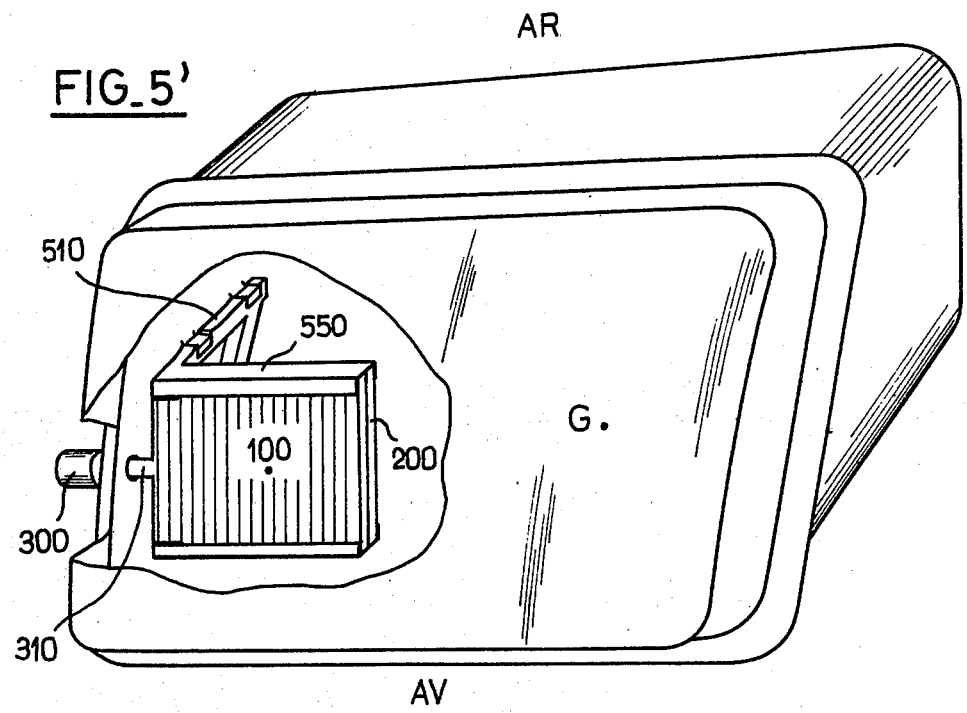
FIG_5'
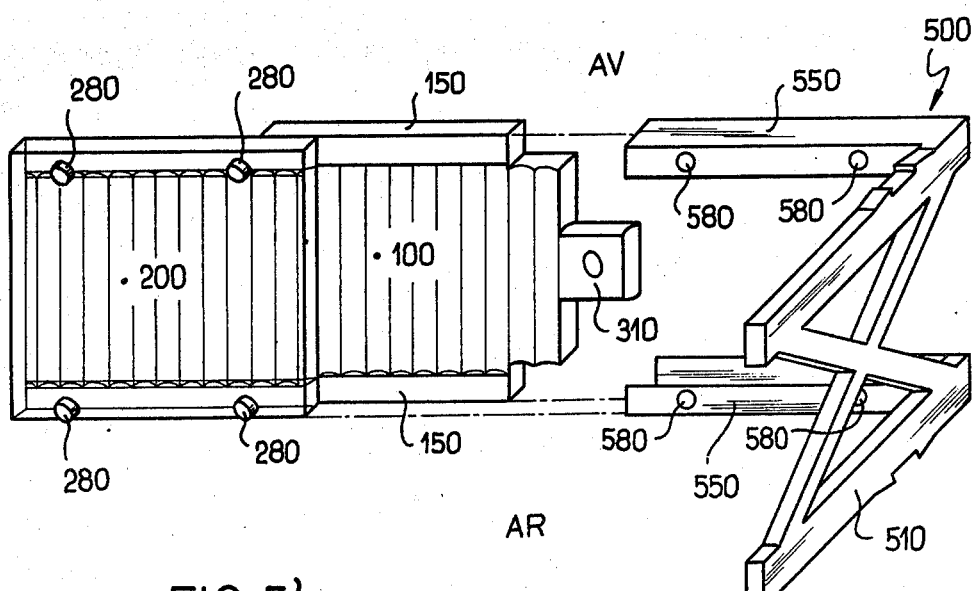
FIG_5'a

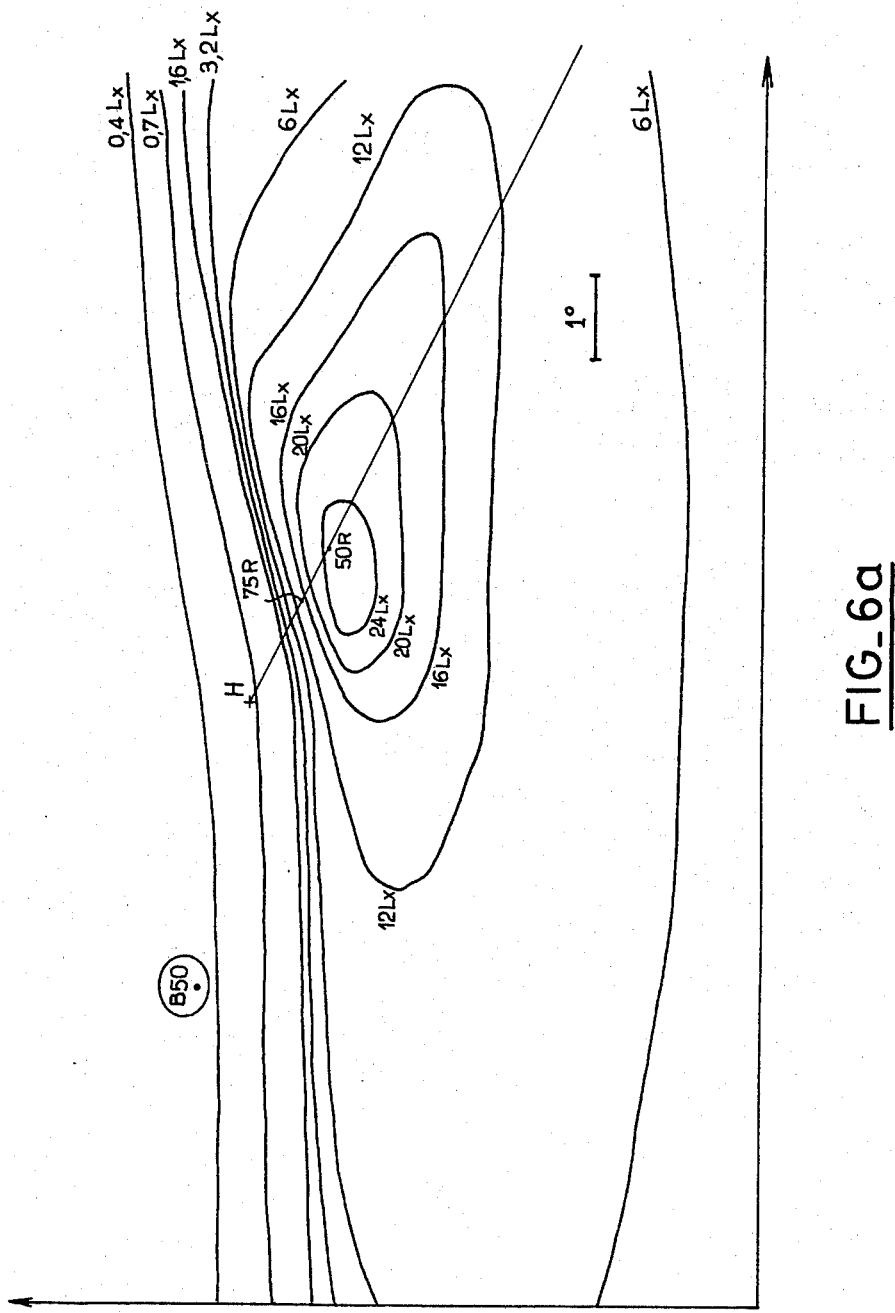
FIG_6a

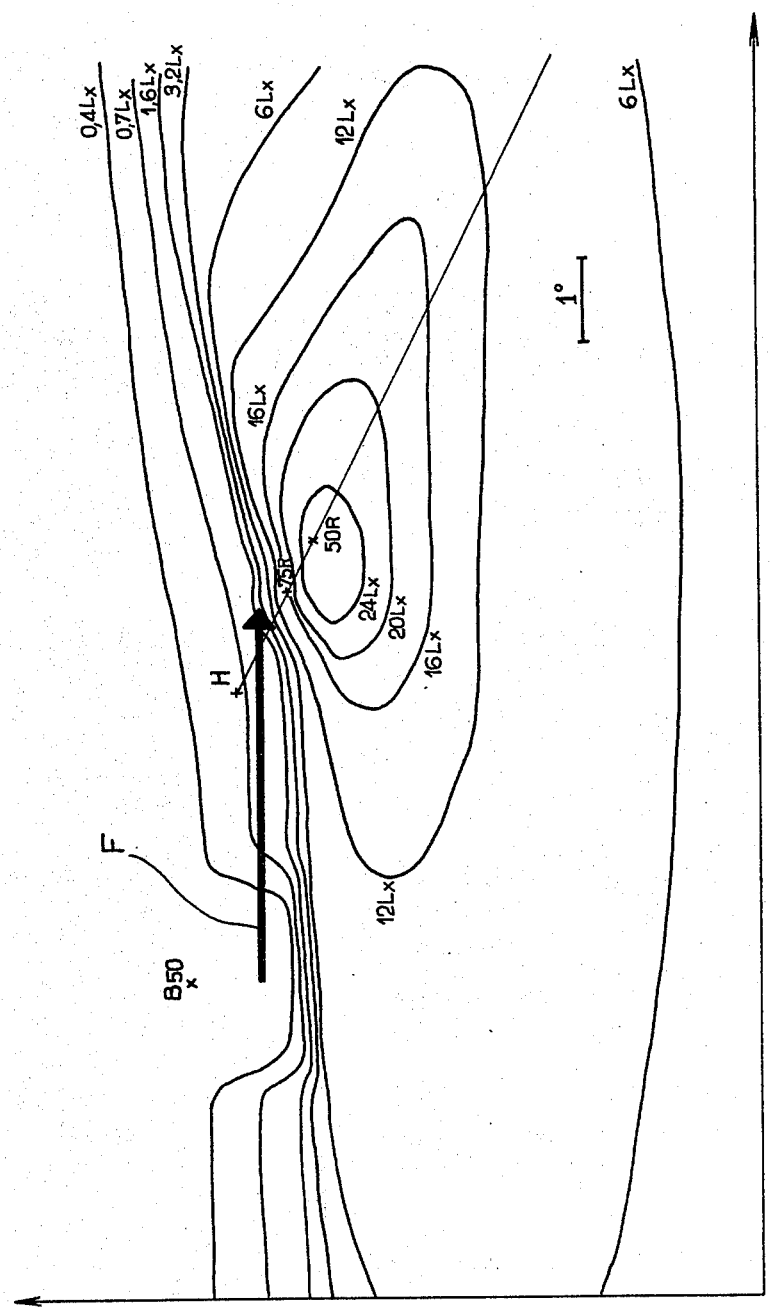
FIG_6b

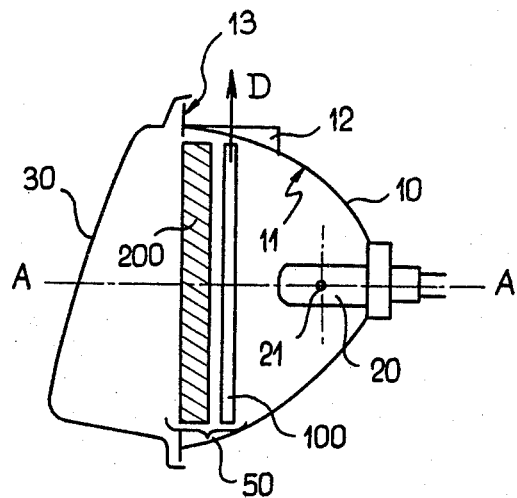
FIG_7
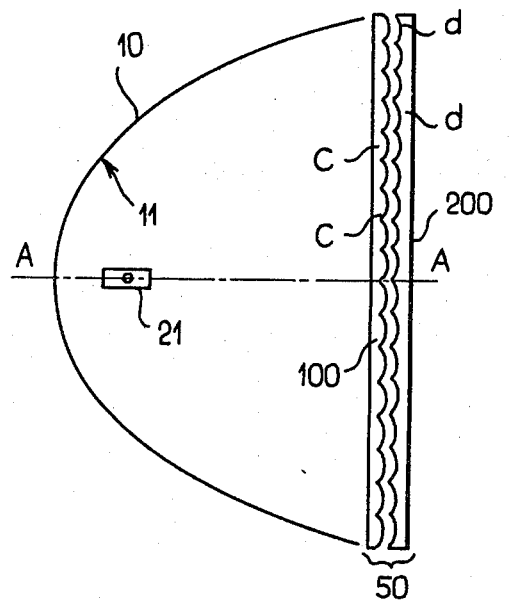
FIG_8
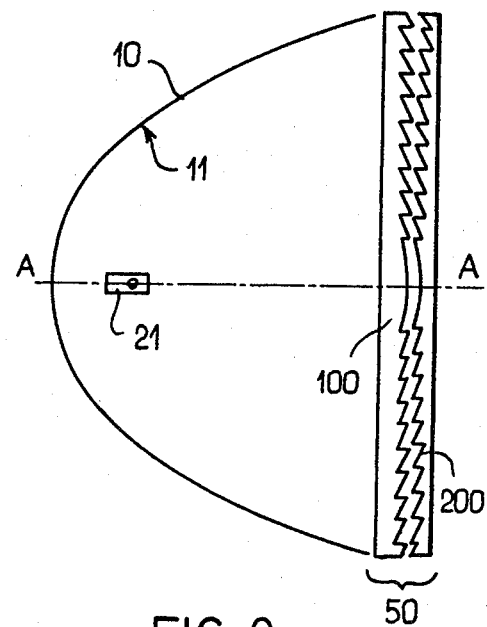
FIG_9

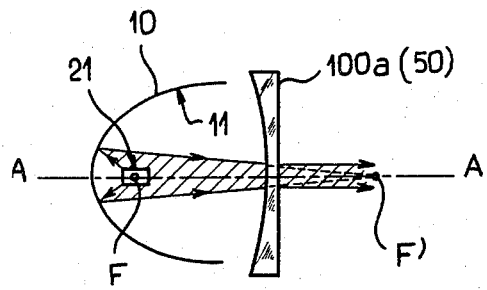
FIG_10
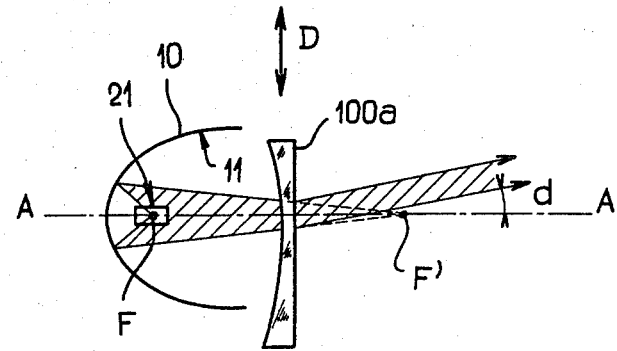
FIG_10a
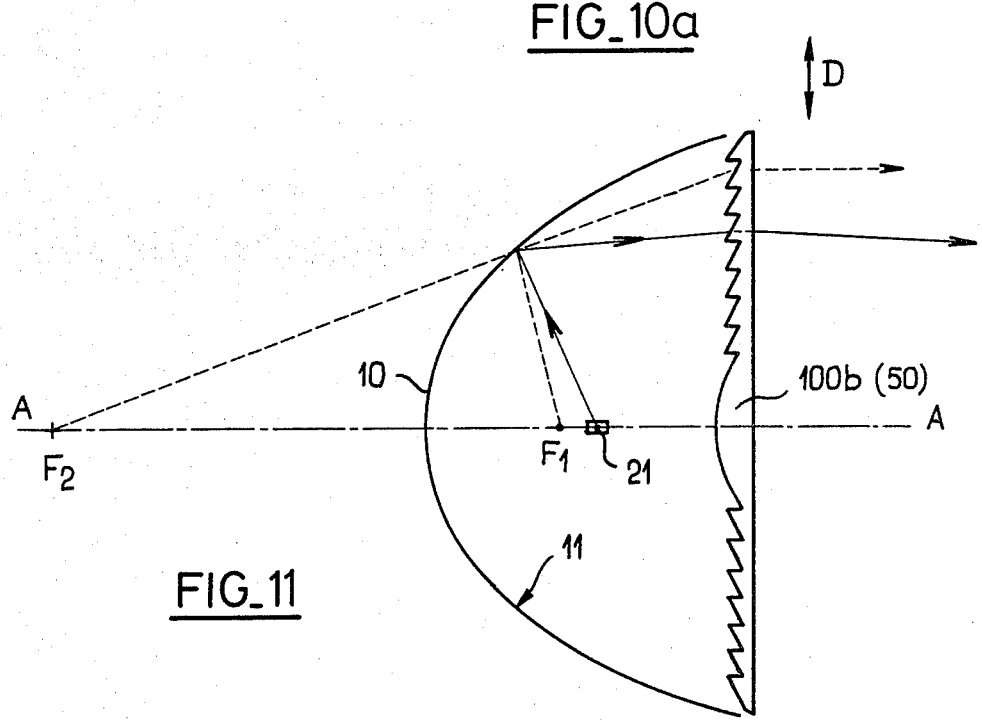
FIG_11

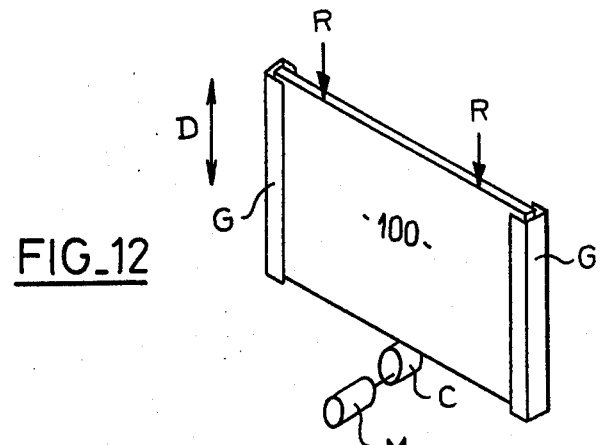
FIG_12
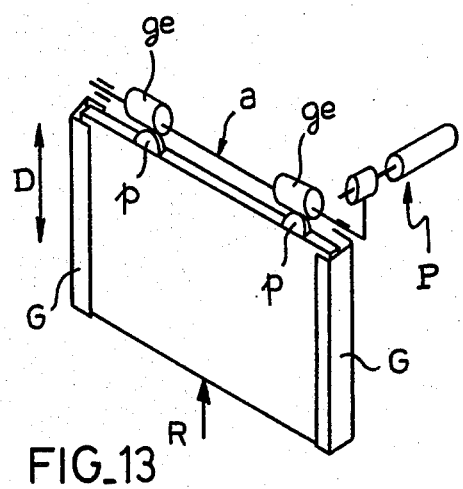
FIG_13
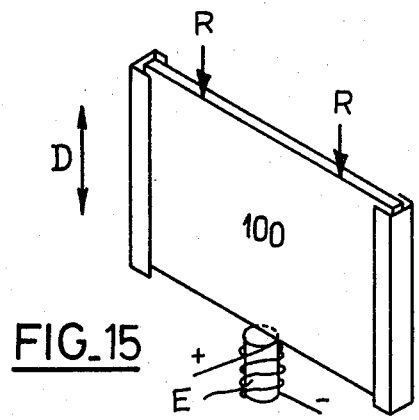
FIG_15
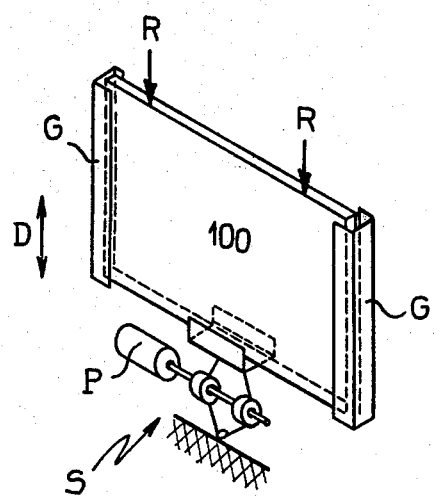
FIG_16
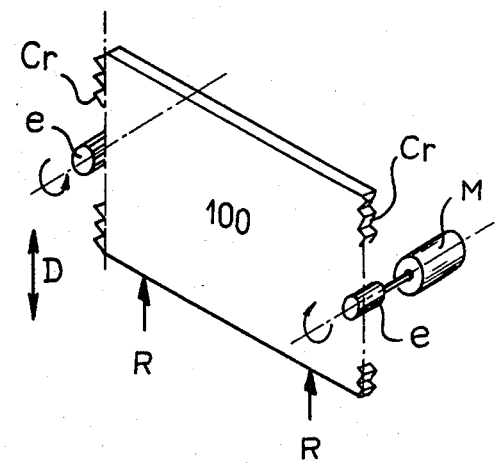
FIG_14

OPTICAL SYSTEMS PERMITTING CONTROLLED SHIFTING OF THE BEAM PATTERN IN HEADLAMPS, ESPECIALLY FOR VEHICLES

FIELD OF THE INVENTION

This invention relates to optical systems which act on the beam produced by a headlamp, to deflect light rays contained in the beam into a different direction, when required. Such systems are particularly but not exclusively applicable to headlamps for automobiles; in such an application, it may for example be desired to modify the distribution of the light contained in a headlamp beam in order to produce an improved dipped-beam illumination pattern, or to adjust the height or direction of the beam.

THE PRIOR ART

Numerous arrangements have previously been proposed for adjusting the height or direction of a vehicle headlamp beam, either manually or automatically, in dependence on the position of the suspended parts of the vehicle relative to its wheels, and/or on the course being followed by the vehicle. For example, the height of the dipped headlamp beam may be adjusted to compensate for variations in the attitude of the sprung parts of the vehicle. The lateral position of the headlamp beam may be varied so that, when the vehicle follows a curved course, the beam is directed more nearly along the curved course ahead.

A further form of adjustment consists in a lowering of the dipped beam when passing an oncoming vehicle, in order to avoid dazzling the driver of the oncoming vehicle.

The usual method of achieving such adjustments has been to adjust the position of the complete headlamp, or at least of its optical system, which usually consists of a reflector and a front lens. The adjusting movement is normally a pivoting movement around an axis. Such a method of adjustment has certain disadvantages. The mass of the moving components is fairly large, so that the mounting and actuating arrangements have to be relatively heavy and expensive. The need to allow movements of relatively large parts means than an even larger space is required in the vehicle bodywork to accommodate them, and it is not always easy to provide sufficient space. The mounting of the movable components has to be well-made, so that it allows only a slight play, if any, of the components. Finally, the need for the front lens of the headlamp to be movable in the bodywork is unattractive from the aesthetic point of view, since, in certain positions of adjustment, there will inevitably be a discontinuity between the bodywork and the lens of the headlamp.

It has already been proposed to provide a headlamp with a beam deflecting system comprising one or more prisms which are movable from an inactive position in which they lie outside the path of the beam which is to be deflected, to an active position in which they intersect the beam. Such prisms are cumbersome, and systems embodying them are not very practical. In addition, they cannot, in general, be used to deflect the whole of the headlamp beam; also they operate in a 'binary' manner, that is to say, the beam is either not deflected at all, or is deflected through a fixed angle determined by the design of the prisms, with no intermediate deflections being possible.

It has also been proposed, in French Pat. No. 1,034,703, to provide a headlamp with a beam adjusting system comprising two networks of lenses, arranged in face-to-face relationship. However, such systems have a severe disadvantage in that they cause not only a change in the direction of the beam, but also a dispersion of the beam, which is undesirable.

It is an object of the present invention to provide a headlamp for a vehicle, which headlamp is adjustable to vary the direction of its beam, and which avoids some or all of the foregoing disadvantages.

SUMMARY OF THE INVENTION

The present invention provides, according to one aspect, in a headlamp for an automobile vehicle, which headlamp is adjustable to vary the direction of the beam produced thereby, and comprises a reflector, and at least one light source fixedly mounted within the reflector, whereby light rays emitted by the light source are reflected by the reflector to form a beam of light, the improvement comprising: providing mountings for fixing the reflector rigidly on a vehicle; providing an optical beam adjusting system comprising at least one generally plate-like transparent optical deflecting element, and means supporting the optical deflecting element in a position to intercept substantially the whole of the said beam formed by the reflector, with the optical deflecting element extending generally perpendicularly to the said beam, and the supporting means permitting an adjustment of the position of the optical deflecting element with at least a component of movement in a direction transverse to the said beam; providing on the optical deflecting element surface configurations of such shapes that those light rays of the said beam which are incident on the beam adjusting system in a given direction emerge from the said beam adjusting system in substantially the same direction as one another, the said direction to emergence being chanbed by the said adjustment of the optical deflecting element, whereby the direction of the headlamp beam is varied without otherwise substantially affecting the characteristics of the headlamp beam; and providing an actuator mechanism connected to the optical deflecting element, for producing the said adjustment of the optical deflecting element.

The present invention may be put into practice in a manner analogous to the invention described in copending application Ser. No. 191,500, in the name of Norbert Brun, filed on the same day as the present application. However, as will become clear from the following description, other embodiments of the invention are also possible.

In one preferred embodiment, the reflector has a paraboloidal reflecting surface, and the beam adjusting system comprises two Fresnel lenses in generally face-to-face relationship, one of which lenses constitutes the said one optical deflecting element, while the other lens is so mounted that the said adjustment of the one lens results in a relative movement between the two lenses; and one of the Fresnel lenses being convergent, while the other of the Fresnel lenses is divergent. The combination of the two Fresnel lenses is such that it has no net converging or diverging effect. However, a translational movement of one of the Fresnel lenses relative to the other will result in a change in the direction of the headlamp beam, in either the same sense or the opposite sense as the translational movement, depending on which of the Fresnel lenses is being moved.

In various alternative embodiments, described later in more detail, a single, movable, Fresnel lens is used, in combination with a reflector which is not paraboloidal, but is either ellipsoidal (if the Fresnel lens is diverging) or hyperboloidal (if the Fresnel lens is converging).

As a further alternative, a spherical reflector may be used in combination with a Schmidt lens.

The optical deflecting elements may be made of any suitable optical material, such as glass or plastics, provided that the refractive index of the material is sufficiently high, for example in the neighbourhood of 1.5.

To allow the relative movement of the deflecting elements, suitable slideways may be provided. The movement may be produced by, for example, mechanical, hydraulic, or electrical means. An electro-magnetic actuator provides a particularly rapid adjustment of the headlamp beam.

The optical deflecting elements may be mounted between the reflector and the front lens of the headlamp. Alternatively, the front lens of the headlamp may actually form part of the beam deflecting system.

BRIEF DESCRIPTION OF THE DRAWINGS

FIGS. 1a and 1b are diagrammatic views of an elemental beam deflecting system, for a headlamp, FIG. 1a showing the system in a neutral position, and FIG. 1b showing the system in a beam-deflecting position;

FIGS. 2a and 2b are diagrammatic views, similar to FIGS. 1a and 1b, showing a deflecting system which in effect comprises a plurality of the systems shown in FIGS. 1a and 1b;

FIG. 3 is a diagrammatic view illustrating the cross-section of the ribs formed on the optical elements used in the deflecting systems of FIGS. 1a to 2b;

FIGS. 4a and 4b are diagrammatic views showing a different form of beam deflecting system for a headlamp, with FIG. 4a showing the system in a neutral position, and FIG. 4b showing the system in a beam-deflecting position;

FIGS. 5, 5a, 5' and 5'a illustrate two forms of headlamp each embodying a deflecting system such as is shown in FIGS. 2a and 2b or FIGS. 4a and 4b;

FIGS. 6a and 6b show the illumination patterns produced by a headlamp such as that of FIG. 5 or FIG. 5', with FIG. 6a showing the pattern produced when the deflecting system is in a neutral position, and FIG. 6b showing the pattern produced when the deflecting system is in a beam-deflecting position;

FIG. 7 is a diagrammatic axial section, on a vertical plane, through a headlamp incorporating a beam-deflecting system embodying the present invention;

FIG. 8 shows, in diagrammatic form, a headlamp incorporating a beam-deflecting system embodying the invention, which system employs optical elements provided with ribs and flutes;

FIG. 9 is a view similar to FIG. 8, but showing a headlamp in which the optical elements are formed as Fresnel lenses;

FIGS. 10 and 10a are diagrammatic views, in axial section, of a headlamp embodying the invention, which employs an ellipsoidal reflector rather than a paraboloidal reflector;

FIG. 11 is a diagrammatic view of a headlamp which employs a hyperboloidal reflector; and FIGS. 12 to 16 illustrate diagrammatically various forms of actuating means which may be used to control a beam-deflecting system embodying the present invention.

DETAILED DESCRIPTION OF THE PREFERRED EMBODIMENTS

Firstly, the principle of operation of a beam deflecting system embodying the invention will be explained, with reference to FIGS. 1a and 1b, which illustrate an elemental deflecting arrangement, from a plurality of which a larger beam deflecting system may be built up.

The elemental deflecting arrangement comprises two transparent elements 100 and 200, arranged face to face in the path of light rays R, so that the light rays pass first through the element 100 and then through the element 200. The element 100 has its surface adjacent to the element 200 formed as a convex cylindrical rib, as indicated at 120; the adjacent surface of the element 200 is formed as a concave cylindrical surface or flute, as shown at 220, whose profile is the complement of the profile of the rib 120. The remaining surfaces of the elements 100 and 200 through which the rays R pass are shown at 110 and 210, and are plane and parallel to one another. The elements 100 and 200 are displaceable, one relative to the other, in the direction indicated by an arrow D, perpendicular to the generatrices of the cylindrical surfaces 120 and 220, which are shown at g, and parallel to the plane surfaces 110 and 210. The amplitude of the relative movement is less than half the extent of the elemental cylindrical surfaces 120 and 220 in the direction of the arrow D.

FIG. 1a shows the elements 100 and 200 in such a relative position that the cylindrical surfaces 120 and 220 lie parallel to one another; this is referred to as the 'neutral' position. It can easily be seen that, with the elements in this position, the rays R pass through the deflecting arrangement without being appreciably deflected; if a ray should suffer a deflection as a result of passing through the element 100, it immediately afterwards suffers a substantially equal deflection in the opposite sense in passing through the complementary part of the element 200.

If, on the other hand, the elements 100 and 200 are shifted away from the neutral position, then, as shown in FIG. 1b, the light rays R suffer a deflection d, in the plane perpendicular to the generatrices g of the cylindrical surfaces 120 and 220.

It has been discovered that it is possible to choose the profile of the cylindrical surfaces 120 and 220 (that is to say, the shape of the directrices of these surfaces) in such a way that the deviation d is the same for all rays, such as R, passing through the elemental deflecting arrangement, for a given relative displacement of the elements 100 and 200 in the direction D from the neutral position.

In practice, as shown in FIGS. 2a and 2b, which are analogous, respectively, to FIGS. 1a and 1b, a beam deflecting system would comprise two elements 100 and 200, which have, on their facing surfaces, ribs 120 or flutes 220, respectively, each corresponding to the single rib 120 or flute 220 of FIGS. 1a and 1b; these ribs or flutes are regularly spaced with a pitch p. As FIGS. 2a and 2b show, the surfaces 110 and 210 of the elements 100 and 200 which face away from the ribs or flutes are plane, without any interruptions corresponding to the discontinuities between adjacent ribs or adjacent flutes.

The deflecting system of FIGS. 2a and 2b is in effect a combination of a number of elemental deflecting arrangements of the type shown in FIGS. 1a and 1b, but the discontinuities between the adjacent elements of the deflecting system do not modify the deflecting effects of these individual elements. Thus, the deflecting effect of the system shown in FIGS. 2a and 2b is just the same as that of the elemental deflecting arrangement shown in FIGS. 1a and 1b. The maximum relative movement of the optical elements 100 and 200 of FIGS. 2a and 2b is always less than half the pitch p.

FIG. 3 is a diagrammatic section taken through a rib 120 on one deflecting element 100 and a flute 220 on a complementary deflecting element 200, the section being taken on a plane at right angles to the generatrices of these surfaces. In this figure, the x-axis is arranged in the direction of the relative displacement D, while the y-axis is arranged along the median line of the flute 220 (and also along the median line of the rib 120, when the two elements are in their neutral position). In the illustrated position, the rib 120 is shifted to obtain a deflection d for a ray R, incident parallel to the y-axis.

It has been shown by theoretical calculations, confirmed by experience, that the complementary profiles 120a and 220a of the rib 120 and the flute 220 may be so chosen that the same deflection d is suffered by any incident ray parallel to the y-axis. These profiles may be defined in terms of the x and y co-ordinates, and will depend on the required deflection d, the refractive index $\mu$ of the optical elements 100 and 200, and the relative displacement $x_o$ of the two optical elements.

The optimum curve is defined by the equation:

$$y(x) = \frac{1}{k} \log_e \left( \frac{1}{\cos kx} \right) \text{ where } k = \frac{d}{(\mu - 1)x_o} \quad (1)$$

It can be shown that, with this curve, the tangents to the two surfaces 120 and 220 at any two points which lie on the respective surfaces 120 and 220, at the same x-coordinate, lie at the same angle to one another, irrespective of the value of the x-coordinate.

For small deflections d, that is to say, less than 10° and preferably less than 5°, it is satisfactory for the profiles 120a and 220a to be defined by a parabolic function, as follows:

$$y(x) = \frac{x^2}{2P} \text{ where } P = \frac{(\mu - 1) x_o}{d} \quad (2)$$

FIGS. 4a and 4b illustrate the principle of operation of a second form of beam deflecting system embodying the invention. In this system, two transparent optical elements 100 and 200 are again used, which have on their facing surfaces a pattern of parallel ribs with a constant pitch p, but in this case, the optical elements are displaced relative to one another, when a deflection is required, by an integral multiple of the pitch p. In the drawings, the ribs are numbered 1, 2, 3, 4, . . . etc.; each rib is of saw-tooth profile, with the sloping part of the profile forming a facet lying at an angle to the plane surface 110 or 210 which increases steadily from rib 1 to the higher-numbered ribs.

In the neutral position, shown in FIG. 4a, facets of the same number face one another, and lie parallel to one another. Thus, the system imposes substantially no deflection on rays incident perpendicular to the surfaces 110 and 210.

FIG. 4b shows the position after a relative displacement D of the two optical elements 100 and 200 has taken place, which displacement is an integral multiple of the pitch p; in the illustrated position, the displacement D is equal to the pitch p. In this position, the facet 1 of one of the optical elements faces the facet 2 of the other, and so on. Because of the increase in inclination from a facet of a lower number to a facet of a higher number, there is, between each pair of facing facets, an air gap bounded by facets which lie at an angle to one another; in the preferred embodiment, the angle between the facets is the same for each facing pair of facets. Thus, any one of the incident rays R will suffer a deflection d which is the same for all the rays R, from one end of the system to the other.

In the foregoing explanations, it has been assumed that the air gap which separates the two optical elements 100, 200, especially in the neutral position, is of so small a thickness as not to affect the calculations of the profiles of the surfaces 120 and 220. However, the thickness of the air gap may be taken into account when making an absolutely rigorous calculation of the required shapes of the optical elements.

FIG. 5 is a front perspective view of an automobile vehicle headlamp embodying the invention. The headlamp has a front lens G, which incorporates at its right-hand side (that is, the right-hand side for a person facing in the direction of travel of the vehicle) a zone 200 (broken away in FIG. 5, for clarity) constituting one of the two optical elements of a beam deflecting system. The beam deflecting system may operate according to the principles previously explained. The second optical element of the beam deflecting system is shown at 100, and is mounted, with its ribs extending vertically, behind and parallel to the front lens G, in such a way that the element 100 may be moved translationally, in the lateral direction, parallel to the front lens G. Actuating means 300 are provided, connected to the optical element 100 by a linkage 310, to produce this translational movement of the element 100. This actuating means may be under either manual or automatic control.

FIG. 5a is an exploded perspective view of certain parts of the deflecting system, taken from the rear. These parts comprise a frame 500, fixed by a cruciform structure 510 to the inside of a side wall of the headlamp, and provided with two slideways 550, in which the edges 150 of the optical element are guided for lateral sliding.

FIGS. 5' and 5'a are views, similar to FIGS. 5 and 5a, of a slightly different form of vehicle headlamp; parts which correspond to parts shown in FIGS. 5 and 5a will be referred to by the same numerals. The headlamp of FIGS. 5' and 5'a differs from that of FIGS. 5 and 5a in that it incorporates a deflecting system comprising two optical elements 100 and 200, neither of which is formed as part of the headlamp lens G; the element 100 is mounted in slideways 550, in much the same way as in FIG. 5a while the element 200 is mounted behind the element 100 by being rigidly attached to the slideways, by means of complementary fixing elements 280 and 580 formed on the element 200 and on the slideways 550.

FIGS. 6a and 6b illustrate the effect of a deflecting system in such a headlamp. These figures show the isolux curves (obtained by calculation) of the beam pattern which would be obtained by projecting the headlamp beam on to a screen, in the conventional testing method. The point H is the point of intersection between the screen and the optical axis of the headlamp, while the points B50, 75R and 50R are other standard points of reference on the screen. FIG. 6a shows the illumination pattern which is obtained with the deflecting system in its neutral position. If now the deflecting system is shifted to the position in which it produces the greatest deflection of that part of the headlamp beam which passes through it, the illumination pattern changes to that illustrated in FIG. 6b. It can be seen that a large part of the light which previously illuminated the area around the point B50 is now deflected to the right, as shown by the arrow F; this strengthens the illumination in the upper right-hand portion of the dipped beam, which is a very desirable result.

FIG. 7 shows, diagrammatically, a further form of vehicle headlamp embodying the invention. This headlamp comprises a reflector 10, a light source 20, a front lens 30 which closes the front of the headlamp and an optical beam deflecting system 50. Unlike the deflecting systems previously described, the deflecting system 50 is of such an extent that virtually the whole of the headlamp beam passes through the deflecting system.

The reflector 10, which preferably forms part of the enclosure of the headlamp, can be made of any material, provided that its inner surface 11 forms an optical reflecting surface; for example, the reflector may be made of pressed sheet metal, of magnesium or aluminium alloy, or of a moulded plastics material, and so on. The reflector is intended to be rigidly fixed in the bodywork of a vehicle by means of mountings which are diagrammatically indicated at 12.

The optical reflecting surface 11 of the reflector 10 is usually (but not always, as will be seen later) a paraboloid of revolution about an axis A—A.

The light source 20 is, in this example, a conventional lamp bulb, whose filament (shown at 21) is at or near the focus of the reflector surface 11. The light from the source 20 is therefore reflected by the surface 11 as a beam in the direction of the axis A—A, and generally surrounding this axis. The beam may be slightly convergent or slightly divergent, depending on the exact position of the filament 21 in relation to the reflector focus.

The lens 30 closes the front of the headlamp; it may be secured to the edges of the reflector 10, around the front opening of the reflector, or it may alternatively be secured to the bodywork of the vehicle. The lens 30 may be completely plain, so that it has no optical effect on the headlamp beam; alternatively, it may have ribs or other features of shape for redistributing the luminous flux of the beam, especially for spreading the beam laterally.

The optical deflecting system 50 is mounted within the space bounded by the reflector 10 and the front lens 30, and, as mentioned above, intercepts virtually the whole of the headlamp beam. The deflecting system 50 may be generally of the type previously described, with reference to FIGS. 1a to 4b; as indicated in FIG. 7, the deflecting system 50 comprises two optical elements 100 and 200 which lie parallel to one another and perpendicular to the axis A—A. The element 200 is mounted to be stationary with respect to the reflector 10, while the element 100 is movable to and fro in the direction of the arrow D, under the influence of actuating means (not shown in FIG. 7).

These movements of the optical element 100 produce a deflection of the beam of the headlamp. In most cases, a movement of a few millimeters is sufficient to produce the required deflection.

If the headlamp is a dipped-beam headlamp, and the deflecting system 50 is intended to be used to adjust the height of the headlamp beam, then the ribs or flutes formed on the optical elements 100 and 200 will be similar to those described above, but will extend horizontally.

FIG. 8, which is a section taken through a headlamp in a vertical plane, illustrates one possible form of the optical elements 100 and 200, which is analogous to the construction illustrated in FIGS. 2a and 2b; in FIG. 8, the element 100 has convex ribs c, which will act as converging lenses, while the element 200 has concave flutes d, which will act as diverging lenses. With such a structure, an angular deflection of the headlamp beam of about 6° can be obtained with a movement of the element 100 of a few millimeters. However, the use of displacements of the order of only a millimeter may lead to excessively stringent tolerances on the profiles of the ribs and flutes of the optical elements. It is therefore preferable to use a displacement of the order of 10 mm. With a movement of this order of magnitude, the curvature of the surfaces of the ribs and flutes need not be very great, so that it becomes perfectly feasible to consider the use of Fresnel lenses.

FIG. 9 is a section, similar to FIG. 8, through a headlamp which employs Fresnel lenses to put the invention into practice. Thus, the primary difference from the headlamp of FIG. 8 is that the optical element 100 is formed as a converging Fresnel lens, while the element 200 is formed as a diverging Fresnel lens. It should be understood that the triangular-section ribs on the facing surfaces 100 and 200 are straight, so that the lenses have no converging or diverging effect in the lateral direction.

With a paraboloidal reflector having a circular front opening of 180 mm diameter, the Fresnel lenses may each have a focal length of 190 mm, if they are situated in the plane of the reflector opening; this gives a beam deflection of 6° for a movement of one lens relative to the other, at right angles to the ribs of the lenses, of about 20 mm.

Preferably, the Fresnel lenses are as nearly planar as possible, and are made in a plastics material, with a large number of ribs. The ribs may have a pitch of the order of 1 mm, or even much less (micro-ribs).

A disadvantage of the various optical deflecting systems described above is that they require two optical deflecting elements, such as the two Fresnel lenses 100 and 200, in the embodiment of FIG. 9. In two further embodiments of the invention, now to be described, only one Fresnel lens is required.

From the optical point of view, the combination of a paraboloidal reflector and a Fresnel lens mounted on the front opening of the reflector is equivalent to an ellipsoidal reflector if the lens is converging, and to a hyperboloidal reflector if the lens is diverging.

In the embodiment shown in FIGS. 10 and 10a, the reflector 10 has a reflecting surface 11 of ellipsoidal shape, with its foci at F and F'. The filament 21 of the light source is mounted near that focus F which is closer to the rear of the reflector, so that the reflector produces a beam which converges towards the focus F'. This convergent beam then passes through a diverging lens 100a, which would in practice normally be a Fresnel lens, but is illustrated as a plain lens, for simplicity. The lens 100a is situated between the two foci F and F', and converts the convergent beam to a more or less parallel beam. The lens 100a is movable, as shown by an arrow D, from the neutral position shown in FIG. 10, in which its optical centre lies on the axis A—A of the reflector 10, and in which therefore the beam leaving the lens 100a is parallel to the axis A—A, to the displaced position of FIG. 10a, in which the beam leaving the lens 100a is deflected, in the direction opposite to the displacement, through an angle d.

FIG. 11 is a diagrammatic view of a headlamp having a hyperboloidal reflector 10 whose optical axis is shown at A—A, whose real focus is at $F_1$ and whose virtual focus is at $F_2$. The dipped-beam filament 21 is situated slightly in front of the focus $F_1$. The reflector 10 cooperates with a converging Fresnel lens 100b which is movable, in the direction of the arrow D, to vary the deflection of the headlamp beam. FIG. 11 shows the lens 11 in its neutral position, in which its optical axis coincides with the axis A—A of the reflector, and in which the resulting headlamp beam is directed along the axis A—A. This embodiment has certain advantages, since it requires a lens which is only gently cambered, and this in turn reduces aberrations, and also reduces any concentrations of light in the region of the lens, so that the heating resulting from such concentrations is reduced.

In another possible embodiment (not shown), a spherical reflector is used, in combination with a Schmidt lens (that is to say, a lens designed to offset the spherical aberrations of the reflector) which also acts as the movable optical deflecting element.

As indicated above, the front lens 30 of the headlamp may have ribs which serve to spread the beam laterally. However, it is equally possible to incorporate such light-spreading ribs in one or other of the elements 100 or 200 of the beam deflecting system. It should also be understood that, in FIGS. 8 and 9, it is possible, as illustrated in FIGS. 5 and 5a, for one of the optical elements 100 and 200 to be incorporated in the front lens 30 of the headlamp.

The actuating means for the movable element of the deflecting system may take any of a variety of forms. FIGS. 12 to 16 illustrate certain possible forms, by way of example. In these figures, corresponding parts are indicated by the same reference numerals. In each figure, an optical element 100, shown as rectangular in shape, is to be shifted vertically against the action of return springs R; the element 100 is preferably movable in guides, which are diagrammatically shown at G.

In the arrangement shown in FIG. 12, a motor or rotary actuator turns a cam C acting on the lower edge of the element 100.

In the arrangement of FIG. 13, a piston-and-cylinder actuator P rocks a shaft a having eccentric rollers or cams ge which cooperate with studs p fixed on the optical element 100.

In FIG. 14, a rotary motor M drives a pinion e which meshes with a rack Cr provided on the vertical edge of the element 100.

In the arrangement shown in FIG. 15, a solenoid E has a movable armature which bears direction on the lower edge of the element 100, to lift it against the action of the springs R.

In the arrangement of FIG. 16, a deformable linkage S, controlled by a piston-and-cylinder actuator P, produces the vertical movements of the optical element 100.

As mentioned previously, the actuating means for the deflecting system may be under manual or automatic control. One possible source of signals for automatic control of the deflecting system, in the case where the deflecting system controls the height of a headlamp beam of a road vehicle, is a light detector arranged to detect light from an oncoming vehicle.

It will be appreciated that the present invention provides a headlamp with a beam deflecting system which has certain advantages over those of the prior art. More specifically, the headlamp of the present invention is formed as an assembly which is essentially fixed in the bodywork of the vehicle, with the front lens of the headlamp requiring no movement relative to the bodywork. The only element which has to be moved is a very light optical deflecting element, and this element has to be moved over only a small stroke. This may lead to substantial economies in materials, and in the energy required to operate the deflecting system. Experiments have confirmed that, with the invention, it is possible to vary the height of a dipped headlamp beam, without significant distortion, over the whole range of adjustment which is normally required. It should be realised, however, that adjustment of the height of a beam is not the only application of the invention; with a suitable arrangement of the ribs on the optical deflecting elements, and of the direction of relative movement of the optical elements, the invention may be used to deflect the beam in other directions, for example laterally.

We claim:

1. In a headlamp for an automobile vehicle, which headlamp is adjustable to vary the direction of the beam produced thereby, and comprises a reflector, and at least one light source fixedly mounted within said reflector, whereby light rays emitted by said light source are reflected by said reflector to form a beam of light, the improvement comprising: providing mountings for fixing said reflector rigidly on a vehicle; providing an optical beam adjusting system comprising at least one generally plate-like transparent optical deflecting element, and means supporting said optical deflecting element in a position to intercept substantially the whole of the said beam formed by said reflector, with said optical deflecting element extending generally perpendicularly to the said beam, and said supporting means permitting an adjustment of the position of said optical deflecting element with at least a component of movement in a direction transverse to the said beam; providing on said optical deflecting element surface configurations of such shapes that those light rays of the said beam which are incident on said beam adjusting system in a given direction emerge from the said beam adjusting system in substantially the same direction as one another, the said direction of emergence being changed by the said adjustment of said optical deflecting element, whereby the direction of the headlamp beam is varied without otherwise substantially affecting the characteristics of the headlamp beam; and providing an actuator mechanism connected to said optical deflecting element, for producing the said adjustment of said optical deflecting element.

2. A headlamp according to claim 1, wherein said reflector has a paraboloidal reflecting surface, and said beam adjusting system includes a second generally plate-like transparent optical deflecting element mounted in generally face-to-face relationship with said first-mentioned optical deflecting element, in such a way that said adjustment of said first-mentioned optical deflecting element results in a relative movement between said two optical deflecting elements, and each of the said optical deflecting elements having a series of parallel ribs, extending generally transversely to the direction of the said relative movement; said ribs of one of said optical deflecting elements being convergent, while said ribs of the other of said optical deflecting elements are divergent, and substantially complementary in shape to said convergent ribs.

3. A headlamp according to claim 1, wherein said reflector has a paraboloidal reflecting surface, and said beam adjusting system comprises two Fresnel lenses in generally face-to-face relationship, one of which lenses constitutes the said one optical deflecting element, while the other lens is so mounted that the said adjustment of said one lens results in a relative movement between said two lenses; and one of said Fresnel lenses being convergent, while the other of said Fresnel lenses is divergent.

4. A headlamp according to claim 1, wherein said reflector has an elliptical reflecting surface, and said optical deflecting element is constituted by a divergent Fresnel lens, and said beam adjusting system comprises no other components acting optically on the beam produced by said headlamp.

5. A headlamp according to claim 1, wherein said reflector has a hyperbolic reflecting surface, and said optical deflecting element is constituted by a convergent Fresnel lens, and said beam adjusting system comprises no other components acting optically on the beam produced by said headlamp.

6. A headlamp according to claim 1, wherein said reflector has a spherical reflecting surface, and said optical deflecting element is constituted by a Schmidt lens, and said beam adjusting system comprises no other components acting optically on the beam produced by said headlamp.

7. A headlamp according to any one of claims 1 to 6, which also includes a front lens for mounting rigidly on the vehicle, and wherein said beam adjusting system is disposed between said reflector and said front lens.

8. A headlamp according to claim 7, wherein said reflector and said front lens together form an enclosure which is rigidly mounted on the vehicle.

9. A headlamp according to any one of claims 1 to 6, which also includes a front lens having ribs for spreading the beam produced by said headlamp.

10. A headlamp according to claim 9, wherein said front lens is adapted for mounting rigidly on the vehicle, and wherein said beam adjusting system is disposed between said reflector and said front lens.

11. A headlamp according to claim 10, wherein said reflector and said front lens together form an enclosure which is rigidly mounted on the vehicle.

12. A headlamp according to any one of claims 1 to 6, wherein said beam adjusting system incorporates ribs for spreading the beam produced by said headlamp.

13. A headlamp producing an adjustable beam, for an automobile, which headlamp comprises, in combination:
(a) a reflector element adapted to be fixedly mounted on the bodywork of said vehicle;
(b) at least one light source mounted to cooperate, in an non-variable manner, with said reflector to produce a beam of reflected light rays;
(c) an optical beam adjusting system comprising at least one movable deflecting element according transversely to the headlamp beam, and intercepting the whole of said headlamp beam; and
(d) actuating means for displacing said deflecting element in at least one direction transverse of said headlamp beam, such displacement producing an adjusting deflection of all the rays of said beam, without a loss of directivity, all such rays incident in the same direction being deflected in a substantially uniform manner.

* * * * *